July 23, 1946.  N. B. WALES, JR  2,404,553
ELECTRIC FUSE AND SETTING APPARATUS
Filed Aug. 6, 1941  6 Sheets-Sheet 1
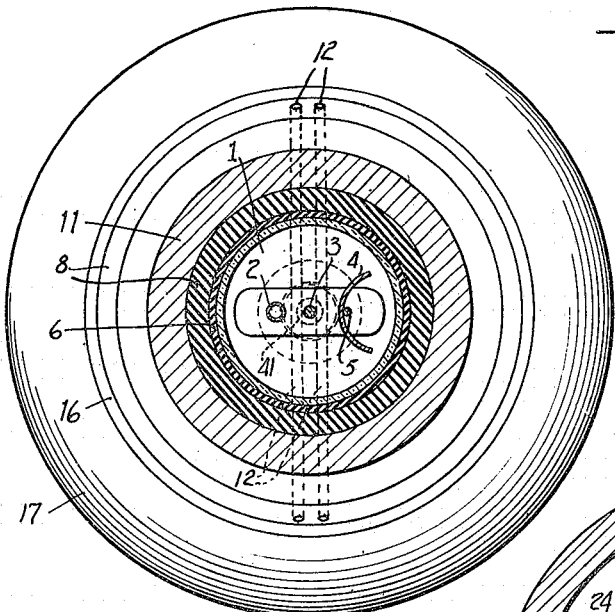
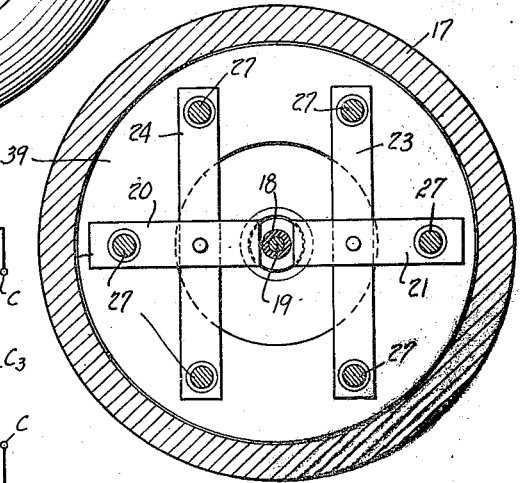
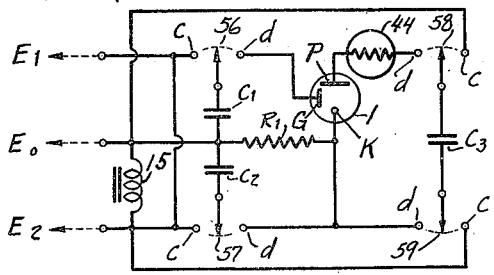
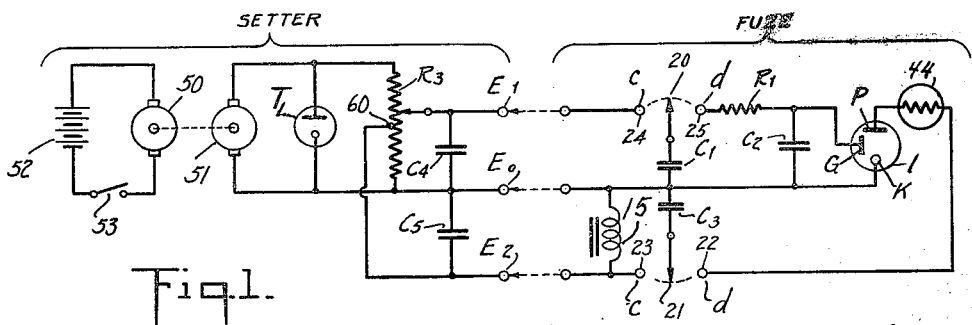
INVENTOR
Nathaniel B. Wales Jr
BY
Pennie, Davis, Marvin and Edmonds
ATTORNEYS

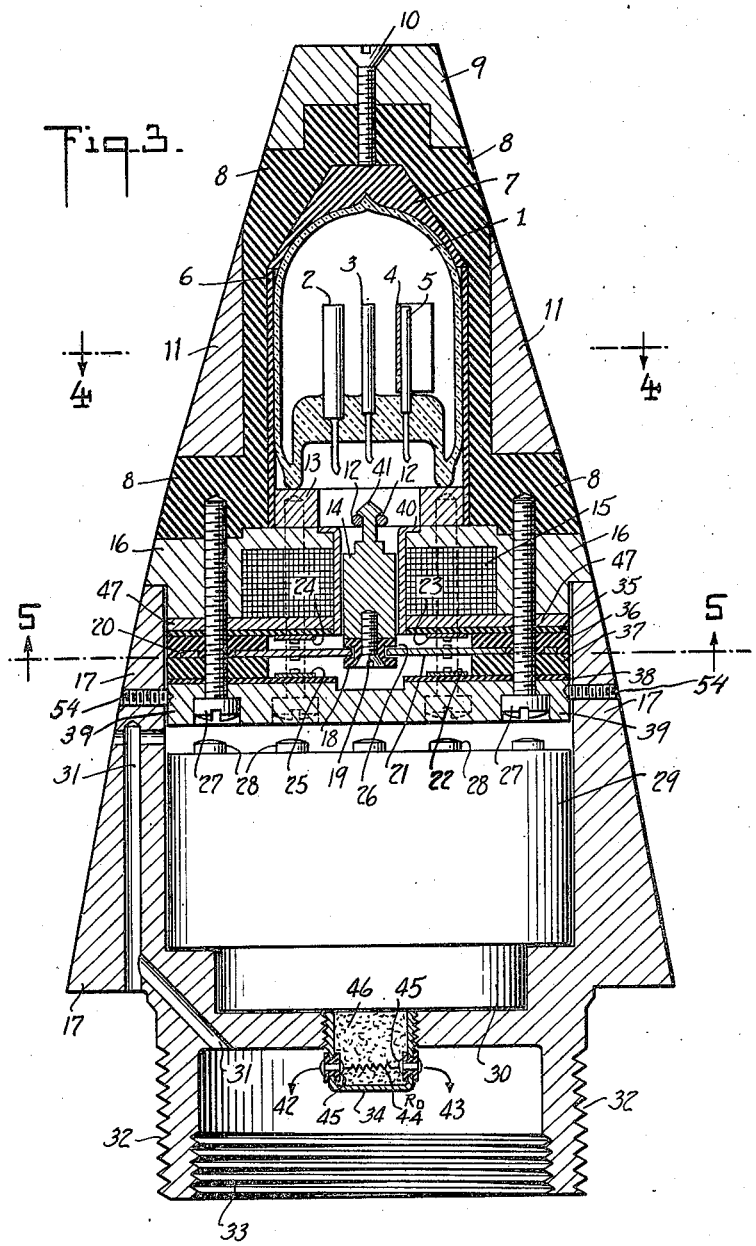

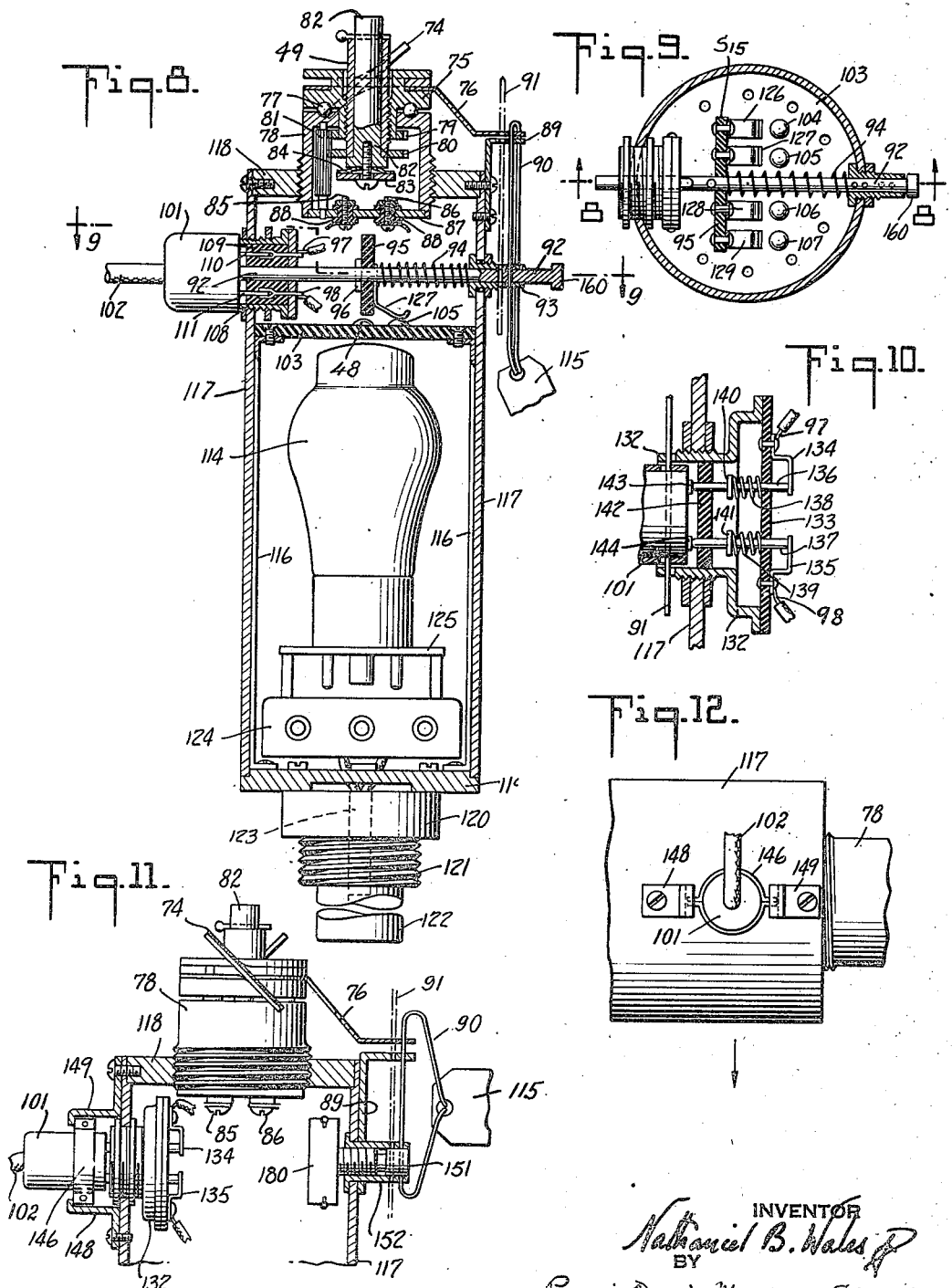

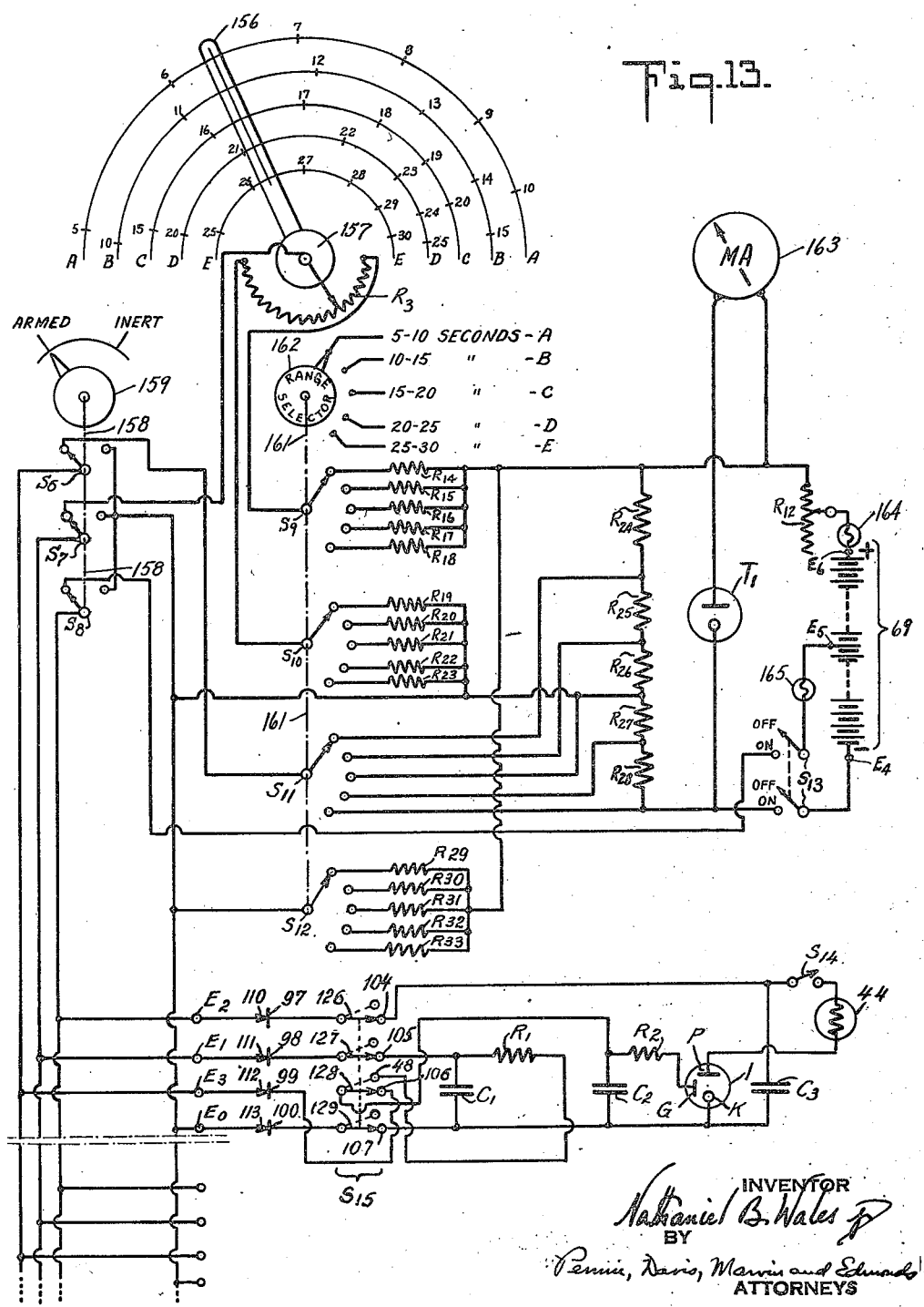

Patented July 23, 1946

2,404,553

UNITED STATES PATENT OFFICE 2,404,553

ELECTRIC FUSE AND SETTING APPARATUS

Nathaniel B. Wales, Jr., New York, N. Y.

Application August 6, 1941, Serial No. 405,570

9 Claims. (Cl. 102—70.2)

This invention relates to electric timing systems and methods adapted to set and initiate the operation of ordnance devices, such as explosive shells, submarine depth charges, aircraft bombs, flares and the like, at a predetermined time measured from the instant of firing or release thereof.

Heretofore, time fuses which have been employed in practice for similar purposes have been largely limited either to pyrotechnic fuses or to mechanisms of a purely mechanical nature, similar to a type of clockwork with a controllable escapement. Although electrical time fuses have previously been proposed, they have been subject to many disadvantages which are overcome by the present invention.

The time fuses and fusesetting apparatus in accordance with the present invention include a large number of advantages among which may be mentioned compactness which is of particular importance in shell fuses, accuracy of timing regardless of weather conditions, simplicity of fuse parts, rapidity and economy in manufacture, and safety in use. The construction according to the invention also allows of thorough testing of the fuses under the same conditions as in actual use.

The fusesetting apparatus in accordance with the present invention makes possible the setting of each time fuse immediately before it is released with its projectile. This enables the setting of each time fuse individually before it is fired or released, whether it be on the ground or in an aircraft, for example, thus introducing great flexibility in the control of the timing of detonation, with many resulting advantages which heretofore have been impossible of attainment, especially in warfare. The mentioned flexibility of control includes the ability to set simultaneously while in flight all of the bombs in an aircraft, if they are to be dropped on the same target; and in the event of emergency, the ability to instantly render the timing circuits of all of the bombs inert to make possible jettisoning the bombs without detonation. Furthermore, the fusesetting apparatus of this invention allows of a considerable range of control of the time periods to which the fuses may be set and also includes provisions assuring readiness and accuracy of the settings, and the entire equipment may be self-contained and portable.

Many of the advantages above mentioned, as well as others which will appear hereinafter, result from the fact that my invention introduces the functional separation of the component elements of the timing circuit from those of the ignition circuit in the fuse so that each element of those circuits may be chosen for optimum performance in its location. Not only is it thus possible to choose the circuit elements specifically for their intended functions, but from this results simplification of the entire mechanism, greatly improved reliability and reduction of the physical size and of the cost of manufacture. To illustrate: the timing circuit of the fuse must employ accurate component parts, but little actual electrical energy is required purely for timing, whereas the ignition circuit should include ample electrical energy to assure ignition, but as long as it is sufficient the exact quantity of ignition energy is not important. Therefore, by means of this separation of elements I am able to use in the timing circuit of the fuse accurate timing condensers, preferably of the paper wound type, and small both in size and capacity, and in the ignition circuit a high-capacity condenser which need not be especially accurate but if it be of the electrolytic type it will combine high capacity with small size and low cost.

In order that the ignition circuit may be discharged at the expiration of an accurately timed interval, the discharge in the ignition circuit is controlled by relay action initiated in the timing circuit. In accordance with the preferred form of my invention this relay action may be performed by a gaseous discharge tube of the three-electrode type, and thus the invention comprises an electronic time fuse.

As an example of the great improvement in compactness introduced by the fuse of this invention, it may be mentioned that only two condensers of sufficiently large electrostatic capacity to furnish detonating energy at reasonable voltages would, if they also must be of an accurate type to be used for timing purposes, occupy a volume about four times as great as the volume occupied by three condensers according to the present invention.

By combining certain electrical and mechanical features in the design of the fuse of this invention an unusually large number of safety devices have been made possible, some of which are interdependent whereby the possibility of accidental detonation is further prevented.

By employing low levels of energy in the timing circuit it is possible not only to improve the structure and operation of the fuse, but it is likewise possible to simplify the structure and improve the operation of the fusesetting apparatus, because the required setting voltage may then be lower than would be required for timing condensers previously proposed.

Many additional features and advantages of the present invention will appear from the following description which is to be read in connection with the drawings, wherein:

Figure 1 is a circuit diagram of a complete time fuse system in accordance with my invention, including timing apparatus and setting apparatus therefor, and which is especially adapted for use with time fuses for shells;

Fig. 2 is a circuit diagram of an alternative embodiment of the timing apparatus for shell fuses;

Fig. 3 is a view in vertical section taken through a shell fuse incorporating many of the features of the present invention;

Fig. 4 is a horizontal section through the line 4—4 of Fig. 3;

Fig. 5 is a horizontal section through the line 5—5 of Fig. 3;

Fig. 8 is a view in vertical cross-section of a time fuse constructed in accordance with my invention and adapted for use in connection with aircraft flares, bombs and the like;

Fig. 9 is a horizontal section through the composite plane 8—8 of Fig. 8;

Fig. 10 illustrates in broken section a combination charging plug ejector and isolation switch structure applicable as a modification to the structure of Fig. 8;

Fig. 11 is a view in partial cross section of a modified form of the ejector and switching device of Fig. 10, together with additional safety mechanism suitable for an aircraft bomb or flare;

Fig. 12 shows in side elevation the mechanism of Fig. 11 in a position in which it would be released from an aircraft;

Fig. 13 is a circuit diagram of a preferred embodiment of my invention as applied to aircraft fuse and fuse-setting apparatus;

Figure 6:
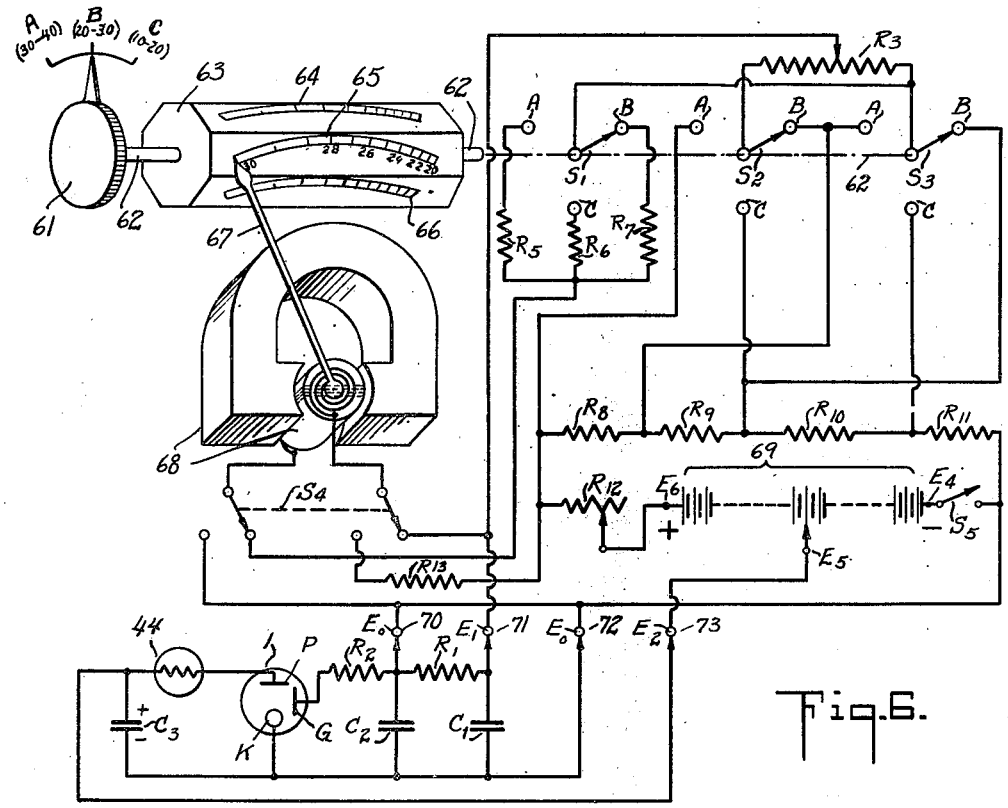
Fig. 6 is a circuit diagram of a time fuse and setting apparatus therefor, particularly adapted for use with aircraft bombs and flares, or submarine depth charges.

An understanding of the timing system in accordance with my invention may be had by reference to Fig. 1 of the drawings, which is a circuit diagram of one modification thereof as applied to the time fuse for a projectile such as a shell. In this circuit diagram is shown also a suitable fusesetting apparatus or circuit by which the timing circuits may be set to operate after a predetermined delay or time interval.

In Fig. 1 the timing circuit proper is shown as comprising condensers $C_1$ and $C_2$ connected at the bottom to a common terminal which comprises a charging electrode $E_0$ and to the cathode K of a three-electrode gaseous discharge tube 1. With switch pole 20 in connection with discharge contact $d$, the other terminals of condensers $C_1$ and $C_2$ are connected together through a timing resistance $R_1$ which, for example, may be of the order of magnitude of 150 megohms. In the particular embodiment of which Fig. 1 is a diagram, condensers $C_1$ and $C_2$ were of 0.5 microfarad each, although the capacities need not be the same, depending on the requirements. These condensers $C_1$ and $C_2$ may be of the paper wound type and be of small but accurate rated capacities. One terminal of resistor $R_1$ is connected to the contact $d$ and the other terminal is connected to the control electrode or grid G of the gaseous discharge tube 1.

The output or controlled circuit of tube 1 includes in series an ignition condenser $C_3$ and a resitsance 44 which in this embodiment comprises the element to be controlled, viz: a detonator resistance or ignitor. One terminal of ignition condenser $C_3$ is connected to the common terminal $E_0$ and also to the cathode K of tube 1, and the other terminal of condenser $C_3$ is connected to the pole of switch 21 which moves to make connection with the contacts $c$ and $d$ according to whether that condenser is to be placed in a charge or discharge position. This ignition condenser $C_3$ may conveniently be of the electrolytic type which has a large capacity and is much cheaper in high capacity sizes than a paper type condenser. Being merely a source of igition voltage the magnitude of its electrostatic capacity is not critical. In the embodiment here being described this condenser was of 8 microfarads.

The operation of this timing circuit is as follows: Assuming switches 20 and 21 to be moved to the left to make connection with contacts $c$ and that appropriate potentials are applied at terminals $E_1$, $E_0$ and $E_2$, respectively, condensers $C_1$ and $C_3$ will be charged with corresponding potentials. Then if condensers $C_1$ an $C_3$ be thereafter connected to the discharge contacts $d$ by movements of switches 20, 21, the charge in ignition condenser $C_3$ will continue to be stored therein because of the normally nonconductive condition of the discharge path of discharge tube 1 between plate P and cathode K. However, as soon as connection between switch 20 and contact $d$ is made, condenser $C_2$ which may be assumed to have had no initial charge will begin to receive a charge from the potential of $C_1$ which will discharge through timing resistance $R_1$. As the charge in condenser $C_2$ increases, a rising potential is applied between the control electrode G and cathode K of tube 1. This process continues at an exponentially decreasing rate determined by the magnitude of the resistance $R_1$ and the initial charges in condensers $C_1$ and $C_2$ until the potential across G and K increases to the breakdown potential of the gas-discharge path between those electrodes. As a typical example, this potential might be between 70 and 100 volts. When this potential is reached discharge occurs between G and K and the entire discharge path of the tube becomes ionized, and the effective resistance of the path between the plate P and cathode K is greatly decreased. This decrease in resistance of the discharge path allows the charge stored in condenser $C_3$ to be discharged through resistance 44 which then becomes heated and effects the ignition or detonation desired. The electrical charge stored in the ignition condenser should preferably be in excess of that required to effect ignition.

From the foregoing description it will be observed that gaseous discharge tube 1 is in effect a relay, the discharge path between G and K being the control or input side and the discharge path between P and K being the controlled or output side. Thus, the discharge path of the relay tube operates effectively to couple the timing and ignition circuits, these circuits otherwise being "electrically isolated" from each other. The term "electrically isolated" is not used here nor in the appended claims to indicate that the ignition and timing circuits are electrically insulated from each other, but only that the ignition circuit is controlled by the timing circuit solely through the discharge path within the tube, and that in all other respects the timing and ignition circuits, and the elements thereof, are functionally independent of each other. Because this tube operates in response to an electrical impulse from the timing circuit to release the ignition energy its operation may be referred to as a "trigger" action. The use of such a relay introduces not only the economies of space and expense, but also has been found greatly to increase the accuracy of timing and the raliability of operation of the entire system in the manner previously pointed out.

Suitable timing circuit setting apparatus is represented at the left of the charging terminals $E_1$, $E_0$ and $E_2$, and may include any convenient source of direct current of sufficiently high voltage, an appropriate device for maintaining the output voltage constant under varying loads, and a control device whereby the charge stored in the timing circuit condenser may be adjusted in order to set the timing circuit for the desired time interval. The apparatus as here shown comprises a battery 52, such as a storage battery, and a control switch 53 in circuit with a motor generator 50—51. Generator 51 can be designed to have a higher voltage output than could conveniently be obtained from a storage battery, for example. Any other suitable source of direct current at the required potential could of course be substituted; for instance, if alternating current were available a rectifier and filter could be employed. In the illustrated system a gaseous discharge type of voltage regulator tube $T_1$ is shown for maintaining more nearly constant the working voltage of this voltage supply.

A bleeder or potentiometer $R_3$ is provided with a fixed tap 60 and an adjustable sliding contact indicated by the arrow. Thus the voltage as impressed across charging condensers $C_4$ and $C_5$ will represent an adjustable voltage $E_1$ and a fixed voltage $E_2$, respectively, in reference to the common return or zero potential $E_0$. This charging system thus allows the calibration of potentiometer $R_3$ in terms of time intervals, such as seconds.

It is contemplated that the three contact points $E_1$, $E_0$, $E_2$ may be connected by any suitable conductive means, such as a multi-wire cable or charging harness to three contacting areas or charging electrodes on the surface of the fuse body, such for example as those shown on the surface of the shell fuse illustrated in Fig. 3, namely, 9, 11 and 16—17 respectively. For the rapid setting of shell fuses a suitable box or receptacle may be arranged to include charging contacts so spaced that they will connect with the corresponding charging electrodes on the surface of the shell. Thus before a given shell is fixed it may be quickly inserted in such a charging receptacle and almost immediately withdrawn with the assurance that the timing and ignition condensers will have received the charges predetermined to effect detonation after the desired delay timed from the firing. A preferred embodiment of such a charging receptacle provides for charging the fuses of shells as they are loaded into the breach of a gun. It may comprise an arrangement of charging contact fingers secured to or near the breach mechanism so as to allow the shell to pass through the contacts in a continuous motion as it is moved toward or into the breach. Thus, in rapid fire operations, the timing of the fuses may be changed very rapidly and immediately before each shell is fired.

Switches 20 and 21 together with the electromagnet coil 15 represent an electro-mechanical relay which will be described in detail in connection with Fig. 3. It will here suffice to state that switches 20 and 21 normally remain in the neutral or unconnected position shown in Fig. 1, but when a charging potential is impressed across contact points $E_0$—$E_2$ the electromagnet 15 actuates the relay and moves switches 20 and 21 to connect with the charging contacts $c$, thus allowing condensers $C_1$ and $C_3$ to be charged. After a very brief interval the charge will have been stored in these condensers and the charging voltages may be removed, whereupon switches 20, 21 return to the neutral position shown. In this position the charges will be accurately retained and a minimum of leakage will occur even though the exterior of the shell be immersed in water. Thereafter when the shell is fired switches 20, 21 are automatically moved by inertia to make connection with discharge contacts $d$ whereupon the timing operation will commence and proceed as above described until detonation occurs.

Fig. 2 is an alternative modification of the fuse system shown in Fig. 1 and is in general similar thereto except that a four-pole switching relay, including coil 15 and switch arms 56, 57, 58 and 59, is employed in place of the two-pole switch shown in Fig. 1.

In operation the circuit arrangement of Fig. 2 differs from that of Fig. 1 in that both condensers $C_1$ and $C_2$ are charged to the same pre-selected potential when the switch poles are thrown to the charging position $c$. In this position the ignition storage condenser $C_3$ is charged through switch poles 58, 59 to a potential in itself capable of effecting the necessary ignition of resistance 44 but incapable of discharging through the high-resistance discharge path P—K of gaseous discharge tube 1. However, when the shell is fired, i. e., on setback, the switches are thrown to the discharge position $d$ thus connecting condensers $C_1$ and $C_2$ in series across electrodes G and K of tube 1, but with such polarities that the charges oppose each other and thus resulting in an absence of potential difference across these two electrodes due to the initial equality and opposition of their potentials. For this reason the discharge path will not be triggered or ionized until condenser $C_2$ has discharged itself sufficiently through high resistance $R_1$ as to produce a difference of potential between $C_1$ and $C_2$ sufficient to initiate the required trigger discharge between electrodes G and K. Condenser $C_1$ will discharge very slowly because there is connected across it the high resistance $R_1$ in series with the still higher resistance of the non-conductive discharge path G—K. When this discharge occurs the relay action as described in connection with Fig. 4 results and the ignition charge stored in condenser $C_3$ will be discharged through detonator ignitor 44.

The structure illustrated in Fig. 3 represents an elevational view in section of a shell fuse which includes many features of the invention, although the construction is equally well adapted to a timing fuse for use in connection with any type of projectile which would in practice be subjected to a reasonably high initial or discharge velocity.

The shell fuse body of Fig. 3 is as a whole, as shown, composed of two separable assemblies. The upper of these assemblies consists of the annular metal block 16 and its associated parts, while the lower assembly consists of the metallic casing 17, together with the components held within or secured to it. Upper block 16 forms with metallic plates 47 a chamber retaining an electromagnetic field winding 15. The magnetic circuit of this winding includes magnetically permeable elements including block 16, plate 47 and the cylindrical armature slug 14 which is centrally guided and axially free to move within a non-magnetic guiding sleeve 40. Screw 19 secures to the lower extremity of the armature slug 14, an insulating washer 18 carrying a peripheral groove 26. In this groove are carried spring switch leaves 20 and 21. These switch leaves when moved upwardly make contact, respectively, with the upper or charge contacts 24 and 23, and when moved to the downward position make contact, respectively, with the discharge contacts 25 and 24. Switch leaves 20 and 21, as well as the contact leaves or strips which carry contacts 23 and 24 are shown more clearly in Fig. 5. Contact strips 22 and 25 are arranged similarly on the opposite side of switch leaves 21 and 20. In the drawings the same reference characters have been used for the switch contact leaves and for the contacts carried thereon. As many contact leaves and contacts as required may, of course, be employed.

All of the contact and switch leaves are spaced and insulated from each other by spacing insulation 36 and 37 and insulating gaskets 35 and 38. Six screws 27 symmetrically spaced secure the upper assembly parts into a unitary structure. Insulating and spacing members 35, 36 and 38 centralize and insulate screws 27 from contact with leaves 20 to 25, inclusive.

The upper extremity of armature slug 14 is formed to include a cam-shaped head 41 which cooperates with two spring pins 12 to form locking means for the armature and the switch leaves. As shown in Fig. 4 these pins pass diametrically through the entire upper fuse assembly in such manner that they may be inserted from the outside after the upper assembly has been completed and tested. Pins 12 normally limit the motion of the armature slug 14 against downward motion from its central position, as illustrated, due to the conical shoulder on the head 41. Armature 41 may move upwardly a distance equal to the length of the post shown just below the head 41. However, when the projectile which carries the described fuse is given an initial acceleration due to firing, as from a gun, the force of inertia on slug 14 will tend to spread apart spring pins 12 by reason of the cam action of head 41, and the slug will move downwardly to a limiting position defined by the backing plate 39.

Included in the lower assembly is a cylindrical lower casing 17 which, for example, may be made of aluminum and formed to include several cavities. The upper cavity 29 is shaped to accommodate, in a preferred embodiment of the invention, two timing condensers which are designated in the circuit diagrams of Figs. 1, 2, 6 and 13 by reference characters $C_1$ and $C_2$. These timing condensers may preferably be of the impregnated paper wound variety, and in any event should be of a high grade and accurate type but small in dimensions. The cavity 30 is formed to include an ignition energy storage condenser which may preferably be of the electrolytic type, and in any event need not be of especial accuracy in rated capacitance, although it should be large enough to store a charge more than normally required to effect ignition. These condensers may be retained in their respective cavities in any suitable manner, such as by a sealing compound. Insulated terminal lugs 28 serve as electrical tie-points to interconnect the upper and lower assemblies in the stages of manufacture, after which the lower and upper assemblies may be secured together by set screws 54.

Cup 34 of suitable material which may be screwed into casing 17 contains a detonating compound such as black powder, in which is imbedded an ignition filament wire 44. The detonating leads 42 and 43 are connected to the ignition wire terminals 45 and are suitably insulated, as shown, where they pass through the walls of cup 34. Conduit holes 31 serve to carry leads 42 and 43 up to the terminal tie-points 28. In projectiles requiring accurate dynamic balance, duplicate holes 31 may be formed in the opposite side of the casing. The lower extremity of casing 17 carries, as shown, an external base thread 32 which may engage a shell forging, and an internal thread 33 which may be utilized to engage a booster cup which usually includes a powder charge, a centrifugal safety gate and other elements of the usual ordnance shell.

The upper assembly of the fuse includes a relay in the form of a gaseous discharge tube 1 which is seated on an annular hard rubber cushion 13 within the cylindrical cavity of an insulating form 8 which may be of Bakelite, for example. Between insulating form 8 and the wall of tube 1 a sleeve or tube 6 of suitable material such as fiber may be interposed. A rubber cushioning cap 7 serves to complete the protection of relay tube 1 by pressing it resiliently against the cushion 13.

Within tube 1 are included, in the device illustrated, three electrodes of tungsten or other suitable metal, two of which may be in the form of rods, comprising the anode or plate 2 and the grid or control anode 3. These electrodes should be spaced closer together than any other pair in order that the break-down potential between them be much less than between any other pair. A semi-cylindrical and coated conductive sheet 4 with its support 5 constitute the cathode of this relay or gaseous discharge tube. This relay is represented in the schematic circuit diagrams of Figs. 1, 2, 6 and 13 by reference numeral 1 and the three electrodes 2, 3 and 4 thereof as P, G and K, respectively. The envelope of relay tube 1 encloses the electrodes in a gaseous atmosphere which may comprise an inert gas such as helium, argon, nitrogen, mercury vapor or a suitable mixture thereof. While the drawing of Fig. 3 is not exactly to scale, it, together with Fig. 4, illustrates the order of magnitude of curvatures of the electrodes which have been determined after extensive experiment to meet the unusual requirements of such a relay for the described purpose. The various engineering requirements involved in the design of such a tube include consideration of the ignition voltage, pre-ignition current, cathode current density and differential field gradient necessary for correct operation at a given gas pressure. Also, the stress requirements of initial acceleration of the order of 1500 gravities as well as extreme compactness must enter into the design for a tube to be used in high velocity shells. For low velocity purposes, as in the case of Fig. 8, the design is not so critical, and commercially available tubes may be employed. Furthermore, the more lenient requirements of fuses in which setback is absent would alternatively permit the use of an electrochemical type of relay adapted to trigger at a predetermined control current in place of the equivalent gaseous discharge relay.

Metal cap 9 secured to insulating form 8 by screw 10 completes the entire assembly which presents three external metal surfaces, 9, 11 and 16—17, insulated and spaced from each other and which form three external electrodes through which charging potentials may pass, when such contact electrodes are placed in suitable connection with corresponding charging contacts arranged to cooperate therewith, as described in connection with Fig. 1.

The mechanical operation of the fuse structure illustrated in Figs. 3, 4 and 5 is as follows: When a suitable electric current is passed through field winding 15 the resulting magnetic flux tends to draw armature slug 14 upward toward the head of the fuse until it subtends the greatest flux density. This motion displaces the spring switch leaves 20 and 21 away from their normal central position as shown. In the normal or central position the switch leaves do not make connection with any other contacts. This magnetically actuated motion of leaves 20 and 21 brings them into connection with the upper fixed contacts 24 and 23, respectively, and this connection is maintained only so long as the actuating current passes through the field coils 15. The time of this contact may be called the "charging time" and during this period the electrical connections are those of Figs. 1 and 2 when the switches 54 to 59, inclusive, are in the charging position indicated by the contacts designated $c$. At this time the potentials necessary to charge the timing condenser $C_1$ of Fig. 1, and condensers $C_1$ and $C_2$ of Fig. 2, and the ignition condensers $C_3$ of both figures are applied to those condensers through suitable connections to electrodes 9, 11 and 16—17 on the surface of the fuse. When the charging is completed and the flow of this actuating current is stopped, contact springs 20 and 21 will return to their normal position, as shown. In this position the external contacts or electrodes 9, 11 and 16—17 are completely disconnected from the circuits of the fuse, whereby the charges stored in the condensers will be unaffected by surface moisture or other conditions which might tend to short-circuit the external electrodes, and the accuracy of the timing will be assured.

Spring pins 12 normally limit the motion of the armature slug 14 against downward movement from its normal central position shown, due to the conical shoulder on the lower portion of the head 41. However, when the shell is subjected to setback in the initial acceleration resulting through its discharge, as from a gun, the force of inertia on slug 14 will urge apart the spring pins 12 by cam action, and the slug will move downward as previously described to a position limited by the backing plate 39. This motion carries spring switch leaves 20 and 21 into connection with lower fixed contacts 25 and 22, respectively. Furthermore, the contacts will be locked in this position even after the setback acceleration has ceased because the upper contour of head 41 after passing spring pins 12 is unable to spread pins 12 by reason of the fact that the spring pressure thereof is greater than the spring pressure of the contact leaves 20 and 21.

As soon as contacts 20, 25 and 21, 22 are closed the timing action of the fuse is set into operation. The circuit connections may then be illustrated by Fig. 1 or Fig. 2 under the conditions when switches 54 to 59, inclusive, are in the discharge position represented by contacts marked $d$. Thus when the timing circuits are connected in this discharge position the detonating device will be actuated at the expiration of the time represented by the predetermined charge stored in the timing condensers as described previously in connection with Figs. 1 and 2.

An important advantage of this invention resides in that it makes possible the complete testing of all the operating portions of the fuse under normal operating conditions. This results from the fact that the weight of slug 14 is such that when the fuse is stood upright, the spring tension, if any, of the switch leaves is overcome, and contacts 22, 25 close, providing of course that spring pins 14 have not been inserted. Thus, before pins 14 are inserted, both the timing and the ignition circuits and the relay 15 may readily be tested.

The system illustrated schematically in Fig. 6 represents a complete time fuse and fusesetting apparatus which broadly speaking is similar to that of Fig. 1. However, the system of Fig. 6 is different in certain respects and includes advantages additional to those of Fig. 1. The system of Fig. 6 is adapted more particularly to the requirements for time fuses and setting apparatus for aircraft bombs and flares which it is desired to ignite at a predetermined time after their release from the aircraft. It is usually desirable to initiate the timing automatically at the instant of separation of the bomb or flare and its fuse from the fusesetting apparatus installed in the aircraft. This characteristic is also desirable in a fuse designed for anti-submarine depth charges where the desired depth for detonation is predetermined in terms of its time rate of sinking.

As indicated previously herein an unusual advantage of the present invention resides in the fact that it makes possible the setting of each time fuse individually the instant before it is released from the aircraft. This enables the detonation of the bomb or flare to be effected at any desired altitude or at the expiration of any desired time interval after release from the aircraft regardless of the altitude of the aircraft itself at the time of release. In previously known time fuses for aircraft use it has been necessary to estimate in advance the probable altitude of the aircraft at the time of release of all of the bombs or flares because it was necessary to set the timing of the fuses before the bombs or flares were loaded in the aircraft. Once the flares or bombs had thus been loaded in the aircraft it was impossible thereafter to change the setting of the timing mechanism without first landing the aircraft.

In connection with the system of Fig. 6 (and with Fig. 13) it is to be understood that an appropriate charging cable harness will be employed to connect the fusesetting apparatus with the several bombs or flares stored in the bomb bay of the aircraft. Generally speaking, this requires merely the necessary connecting wires grouped into a cable running from the terminals 70–73 inclusive of Fig. 6 and divided into as many electrically parallel branches as there are fuses to be set. At the terminal of each branch is an appropriate charging plug which is placed in electrical contact with the charge electrodes of each individual fuse. Such plugs are described in more detail in connection with the fuse structures illustrated in Figs. 8 to 12.

Referring now to Fig. 6, above terminals 70–73 are shown the circuit connections of a fusesetting apparatus suitable for use in aircraft and which in itself may be compact and rapidly adjusted to set the fuses connected thereto individually for any desired time delay of detonation. This setting apparatus is adjustable by means of a multiple switch shaft 62 having a plurality of positions arranged to subdivide the setting voltages, corresponding to the total range of time intervals over which the fuse is operable, into a number of contiguous scale-ranges. A pointer or knob 61 indicates the scale-range in operation. In the drawing, three such scale-ranges are illustrated and labeled A, B and C respectively, and these cover the decade time intervals of 10–20, 20–30, and 30–40 seconds, respectively. The poles $S_2$ and $S_3$ of switch 62 are connected so as to progressively subtend three adjacent intervals of voltage across a bleeder resistance comprising resistors $R_8$, $R_9$, $R_{10}$ and $R_{11}$. The potentials along this bleeder are sustained by current source 69, here represented as a battery but which may comprise any suitable source of direct current as explained in connection with Fig. 4. This current source has three progressively higher potential taps $E_4$, $E_5$ and $E_6$. A potentiometer $R_3$ is connected across switch poles $S_2$ and $S_3$ and the adjustable slider on this potentiometer is connected as shown through charging contact 71 to charging electrode $E_1$ of the fuse. Thus there are three adjacent ranges of voltage which can be delivered to the fuse, these ranges being selectable by the switches $S_2$ and $S_3$, and within each range the voltage may be subdivided by potentiometer $R_3$. Switch $S_5$ is provided to conserve the current when the fusesetter is not in use.

The movement of a voltmeter 68 is connected so as to indicate the subdivision of the interval which the adjustable tap of potentiometer $R_3$ subtends. Consequently, a full scale deflection of this meter movement may be produced by the voltage available in each range, providing the series multiplier resistance connected in circuit with the meter is selected to yield full scale deflection for the total voltage in each interval. This selection of correct meter multiplier resistance is effected by switch pole $S_1$ which successively introduces multiplier resistances $R_5$, $R_6$ and $R_7$ automatically with the turning of shaft 62 by manual selector knob 61.

Provision is made to check the total voltage across the bleeder by displacement of switch $S_4$ to the alternative position from that illustrated. The resulting connection introduces meter multiplier $R_{13}$ in circuit with the meter so that full scale meter deflection then corresponds to the peak voltage across the bleeder. The series regulation rheostat $R_{12}$ allows adjustment of the bleeder voltage to a predetermined operating value.

As a convenience in reading the meter separate scales 64, 65 and 66, each subdivided in 10 graduations of one second each, may be carried on a plurality of cylindrically polygonal faces so phased with the range positions of shaft 62 that only the corresponding scale presents itself on the face of the instrument at any given setting of the knob 61. However, it is evident that whether this mechanism of scale separation be used or whether the several scales be inscribed on one meter face, economy of space and ease of accurate setting by the multiplication of effective scale lengths will be effected by the division of the fusesetting control $R_3$ into several ranges, each of which produces a full scale meter deflection, thus allowing rapid setting of each fuse in terms of time.

The system above described provides an adjustable voltage $E_1$ to the charging cable harness connection 71, a fixed voltage $E_2$ at connection 73 for charging the ignition storage condenser $C_3$ of the fuse, and a zero or ground return $E_0$ at connection 72. A fourth connection 70 is provided which is connected by a jumper in the charging cable plug to the zero potential lead 72.

The circuit arrangement and circuit elements of the time fuse apparatus are similar to that of Fig. 1 except for certain improvements now to be described. The components of the fuse comprise as before, preferably timing condensers $C_1$ and $C_2$ of the accurate paper-insulated variety, an ignition energy storage condenser $C_3$ preferably of the electrolytic type, a detonator or ignition wire 44, gaseous discharge tube 1, a high-resistance leakage resistor $R_1$ and a limiting resistor of medium resistance value $R_2$ later to be described. The timing condensers may be of 0.5 microfarad and the ignition condenser of about 20 microfarads capacity. A structure suitable for such a fuse circuit, together with a charging plug therefor, is described in connection with Figs. 8 to 12 inclusive.

The operation of the fuse represented in Fig. 6 is similar to that of the fuse represented in Fig. 1, it being recalled that the fuse of Fig. 1 is especially adapted for use in connection with a shell of comparatively high velocity whereas that of Fig. 6 is more especially adapted for use in connection with missiles of low velocity such as aircraft bombs and flares.

During the time when the fuse of Fig. 6 is connected to the setting contacts 70–73 the condenser $C_2$ is shortcircuited by a shortcircuiting connection or jumper between contacts 70 and 72. This jumper may be included in the wiring of a suitable charging harness which would interconnect the fusesetting apparatus and the several fuses as already described. While condenser $C_2$ is shortcircuited no voltage is impressed across electrodes G—K of tube 1 and no discharge of that tube can occur. However, due to the large value of timing resistance $R_1$ this external shortcircuit does not prevent the adjustable tap of potentiometer $R_3$ from maintaining a preselected voltage on timing condenser $C_1$. Consequently when the bomb or flare containing this fuse is dropped the resultant breaking of the connections at contacts 70–73 removes the shortcircuit from $C_2$ and thereby initiates the exponential rise of potential in condenser $C_2$, which comprises the timing process as described in connection with Fig. 7.

The value of resistance $R_2$ being negligible in comparison with resistance $R_1$ the rising potential in condenser $C_2$ will at the predetermined time reach the breakdown potential of the path between electrodes G and K of tube 1. The subsequent discharge will be transferred as before described, by relay action through the discharge path of the tube to the power electrodes P—K, thereby actuating the detonation by heating igniter 44 with the discharge of the energy stored in ignition condenser C₃.

Limiting resistor R₂ may be connected in series with a control electrode G to insure that the final discharge characteristic of the tube 1 will be identical with those measured during the test and inspection operations of manufacture. This precaution derives from the discovery that any discharge within the cold cathode type of tube such as tube 1 which exceeds certain minute values of current density will probably alter the characteristics of the tube for its next discharge. Thus without some means for compensating for such alteration of characteristics the mere testing of the circuits including such a gas discharge tube may change the characteristics thereof so that when it is thereafter employed for the intended purpose it will not operate according to the characteristics observed during the test. Furthermore, since the value of ignition potential is a function of the pre-breakdown control-electrode current any series limiting resistor, such as must be used in manufacturing inspection to prevent alteration of the discharge potential characteristics will change the exact required voltage at which the rising potential will ignite the tube. For this reason resistor R₂, which in the embodiment described was of 10,000 ohms, is permanently incorporated in the fuse both for manufacturing tests and for final operation so that the behavior of the tube will be identical under both circumstances. Such resistor should not be incorporated in the plate electrode or ignition circuit as it would limit the detonating current. However, the discharge potentials of the plate-to-cathode (P—K) path obtained without and with such a limiting resistor in the control circuit do not differ sufficiently to be of significance, nor does the presence of this limiting resistor in any way affect the accuracy of timing because the initiation of discharge is the sole function of the control electrode due to the fact that the potential which is supplied to the ignition energy condenser C₃ is intentionally inadequate to produce discharge across the discharge path P—K without aid from the trigger discharge effective between electrodes G—K.

Figure 7:
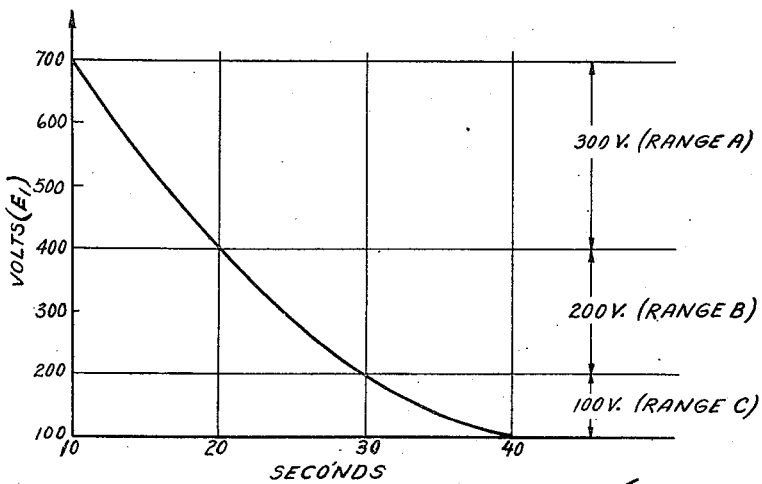
Fig. 7 is a graphical representation of the charging voltages required to effect a certain preselected range of delay in the time of detonation of one example of the fuse circuit of Fig. 6.

The graph illustrated in Fig. 7 represents the relation between the charging voltage (E₁) stored in timing condenser C₁ and the time required to trigger the discharge path G—K of tube 1 in Fig. 6. This curve is of course exactly representative only of a certain time fuse circuit with certain components as employed in the measurements from which the curve of Fig. 7 is derived. However, it may be taken as generally representative of the relations which may be expected from a fuse circuit of the type described and indicates the order of magnitude of the charging voltages required to be impressed on condenser C₁. This curve of Fig. 7 indicates that due to the exponential nature of the time-voltage relation, the successive decade time ranges corresponding to the positions A, B and C of the range selector knob 61 in Fig. 6 will subtend decreasing ranges of voltage.

It is also to be noted in connection with Fig. 7 that as the slope of the curve becomes more flat the statistical mean deviations of fuse timing operations from the preselected values may be expected to increase due to the consequence that a given uncertainty, either in the ignition voltage of the tube or in the constancy of the voltage supply to the setting apparatus, will subtend an increasingly larger corresponding uncertainty in the exact time of ignition.

The mechanical construction of a time fuse having various safety and control features, all in accordance with the present invention, is illustrated together with certain modifications in Figs. 8-12, inclusive. It is to be understood that the fuse mechanism in these figures may include, for example, the time fuse circuit illustrated in Fig. 6, or in Fig. 13. This structure, with its modifications, was originally designed as a fuse for aircraft flares and bombs, but it is also applicable to other uses, as will occur to those skilled in the art.

Referring first to Figs. 8 and 9, a cylindrical fuse body 117 is shown to be closed at its upper end by a head bushing 118 into which is threaded an arming vane switch casing 78. A base 119 for the fuse body supports an adaptor 120 bearing external threads 121 provided to engage the bomb forging or flare body as the case may be. A small propeller or air vane 74, here represented as including two vanes, is secured to bushing 75 which is journaled axially in casing 78 so that bearing balls 77 receive the thrust of air pressure on vane 74. Rotation of vane 74 due to the free fall of the bomb or flare to the nose of which it is attached rotates a driving spur gear 79 which is secured to bushing 75.

Axially threaded in the bushing 75 is a sleeve 49 which is integral with a driven gear 80. This driven gear differs by one tooth from driving spur gear 79. Pinion gear 81 engages both of gears 79 and 80 and is arranged to revolve freely on a fixed axis. Thus the rotation of bushing 75 will slowly revolve screw sleeve 49 by reason of the epicyclic gear action resulting from the gear train just described. Since this screw sleeve 49 is threaded into bushing 75, as shown, the rotation of the sleeve will progressively move the sleeve downward.

Secured to sleeve 49 is an insulating stud 82 to which is secured contact disk 83 and spring backing washer 84. The downward motion of sleeve 49 above described will therefore progressively carry the contact disk 83 downward until, after a predetermined number of revolutions of the sleeve, contact screws 85 and 86 will be connected together by contact disk 83. Contact screws 85 and 86 are insulated from base plate 87 by washers 88. These contact screws are connected in the ignition circuit preferably in series with the igniter or detonator resistance so that it is impossible for detonation to take place until the circuit through these contact screws is closed. This arrangement, which may be termed an arming switch, acts as a safety device to prevent premature detonation and to allow detonation only after the air vanes have turned through several hundred revolutions, for example. This switch is indicated in Fig. 13 by reference character S₁₄; and it is to be understood that a similar switch may be inserted in the circuit of Fig. 6. It will be obvious that the motion of sleeve 49 may be made to engage any suitable switching device at the predetermined number of vane revolutions, and that this switching operation may comprise the complete electrical disconnection or short-circuiting, or both, of ignition device 123 (Fig. 8). It will be seen that when this safety or arming switch is open detonation by actuation of the ignition circuit cannot occur under any circumstances, and also that it cannot occur until, by operation of the air vane mechanism, the bomb or flare carrying this air vane has dropped a sufficient distance to effect electrical connection across contacts 85 and 86.

Prior to release of the fuse from the aircraft, vanes 74 are prevented from rotation by stop arm 76, secured to bushing 75, which is locked or secured to bracket 89 affixed to the fuse body 117. A so-called "arming wire" 91 locks together stop 76 and bracket 89 by passing through suitable holes therein. When it is desired to release the bomb or flare from the aircraft, arming wire 91 is withdrawn from the bracket and stopped, either manually, or by reason of the fact that one end of the wire 91 has been secured to the structure of the aircraft from which the fuse is dropped.

In order to prevent fouling of the charging cable harness and at the same time to provide certain switching facilities desirable to perform at the instant of release of the fuse, an ejection plunger 92 is provided to slide through bushing 93 (Fig. 8). Secured to the opposite side of the fuse body 117 is an insulating bushing 108 carrying suitable contacts 108 (this bushing and contacts being formed as a receptacle) to which may be secured connecting wires such as 97 and 98 connecting with the appropriate elements of the timing circuit. A spring 94 acting against an insulating plate 95 on plunger 96 tends to urge the plunger through the receptacle to press against charging plug 101 which terminates the charging cable 102. Spring 94 should be of sufficient strength to insure, when released, the ejection of charging plug 101.

As will be observed from the drawings, arming wire 91 when in position is arranged not only to lock the air vane from revolving but also to prevent ejection plunger 92 from moving in the direction of plug 101. This result is achieved by providing holes through bushing 93 and plunger 92 through which the arming wire passes. As a consequence of this additional locking feature plunger 92 is unable to move until the instant of release of the fuse at which time the withdrawal of arming wire 91 permits plunger 92 to eject plug 101 and disconnect it from contacts 108, finally coming to rest against stop shoulder or head 160.

Secured to plunger 92 is an insulating plate 95 which therefore moves with the plunger. This plate carries four (or a different number if required) spring switch leaves 126—129 which, in the charging position prior to the ejecting action of plunger 92, connect with switch contact points 104—107. These contact points are secured to an insulating plate 103 which in turn is secured to the base 119 of the fuse body by suitable supporting brackets 116. This construction facilitates assembly of the entire structure. By combining this switch means with the charging plug ejection means an additional feature of safety and accuracy is provided by enabling the automatic changing of circuit connections at the instant the fuse is disconnected from the charging cable.

In certain fuse circuits (see Fig. 13) it is desirable, not only to break but also to make contact at the instant of release of the fuse. For this purpose a contact point 48 is provided so that the associated switch leaf functions as a single pole double-throw switch, whereas the remaining poles may be simply single-throw poles, as shown. The switch poles and corresponding contacts just described are illustrated at the lower portion of Fig. 13 in a modified embodiment of this invention. It is also to be noted that the described ejection of the charging plug disconnects internally within the fuse structure all connections from the charging receptacle contacts to the circuits of the fuse, thus preventing rain or moisture which may accumulate on the external contact surfaces, necessarily exposed after ejection of the charging plug, from electrically affecting operation of the fuse in any manner.

A so-called "shipping wire" 90 and tag 115 attached thereto are provided as an additional safety feature by threading wire 90 through the plunger and bushings 92, 93 as well as through stop and bracket 76, 89. This shipping wire would be removed after insertion of the arming wire at the time the bomb or flare is loaded into the aircraft.

The remaining components of the fuse and its mechanism are housed in the lower portion of the cylindrical fuse body 117. Casing 124 encloses the several electrostatic condensers such as $C_1$, $C_2$ and $C_3$ of Figs. 6 and 13, and elements 114 and 125 comprise a suitable gaseous discharge tube and its socket. As previously indicated, the requirements for a gaseous discharge tube suitable for use in connection with aircraft bombs and flares are not so exacting as those required for use in high velocity shells and therefore the relay tube 114 may be of a type commercially available, although the tube illustrated in Figs. 3 and 4 is admirably suited for the purpose. A suitable detonating ignition device 123 is secured to adaptor 120 and projects into the powder booster cup 122 which screws into adaptor 120. These portions of the fuse may be understood to be similar to corresponding components heretofore employed in connection with aircraft bombs and flares.

Fig. 10 shows a modification of the ejector and switching device shown in Figs. 8 and 9. Here the charging plug 101 is retained against the force of spring-actuated ejection pins 136 and 137 (there being as many as required) by the restraining action of arming wire 91 which passes through bushing 132 and through plug 101. With the elements in the relative positions illustrated, pins 136 and 137 not only make electrical contact at the points 143 and 144 respectively of the plug, but also make contact at their other ends with contact leaves 134 and 135. These contact leaves are connected respectively to wires 97 and 98 which it is to be understood connect with the circuits of the fuse as described in respect to Figs. 8 and 9.

Upon withdrawal of arming wire 91, pins 136 and 137 are forced to move by springs 148 and 149 which press on the stops 140, 141 secured to those pins. This movement will take place toward the left, in the drawings, through guide holes in insulating plates 133 and 142. The resulting pressure on the charging plug through the contacts 143 and 144 ejects the plug and simultaneously moves pins 136 and 137 out of contact with leaves 134, 135. These pins thus perform both of the operations of ejection and switching.

In Figs. 11 and 12 a further modification is illustrated in which a retaining ring 146 secured to charging plug 101 and having ears, as shown, is arranged to cooperate with brackets 148 and 149 shaped to conform with the contour of the plug and ring, thus functionally replacing arming wire 91 of Fig. 10 in locking plug 101 in position until the time of release. Otherwise the combined ejection and switching mechanism of Fig. 11 may be understood to be similar to that of Fig. 10. These retaining brackets 148 and 149, in their cooperation with the ears of retaining ring 146, are positioned on the fuse body 117 in such manner that when the fuse body, as stored in the aircraft, is dropped or released therefrom, the movement of the fuse body will be in a direction such as to permit the separation of the fuse body from the charging plug in the manner illustrated in Fig. 12 where the arrow below the drawing represents the direction of movement of the fuse body with respect to the plug 101 which remains attached to cable 102. Since in the arrangement of Figs. 11 and 12 the separation of the fuse from the contacts of the receptacle with which it is adapted to make connection, is by a sliding motion it is evident that the form of the contacts will differ from that of the contacts in Fig. 8, for example, where the contacts of the plug are actually inserted into corresponding receptacle contacts. It will be evident from the foregoing that any form of receptacle and cooperating plug may be employed so long as it be functionally suited to the purpose.

If it be desired to combine the charging cable release arrangement of Figs. 11 and 12 with a switching device controlled by an arming wire, the structure shown in association with spring-actuated plunger switch 180 in Fig. 11 may be used. In this arrangement the arming wire 91 retains spring-actuated switch plunger 151 within the bushing 152 by reason of the fact that the wire is threaded through holes in the bushing and in the plunger. Upon withdrawal of the arming wire, switch 180 is actuated by the spring within it to effect any necessary switching operation, and may be understood to perform any of the switching operations which are performed by the switches described in Figs. 8, 9 and 10, for example. The shipping wire 90 is included for the reason mentioned in connection with Fig. 8.

The system of Fig. 13 represents the preferred embodiment of my invention, and includes a time fuse and setting apparatus therefor, both especially useful in connection with aircraft bombs and flares. The circuit arrangement of the time fuse of Fig. 13 is essentially the same as that of Fig. 6, most of the differences being in the fuse-setting apparatus, the connections between that apparatus and the fuse, and the incorporated switching arrangements. With this fusesetting apparatus it is possible for the bombardier or operator of the device first to select the range in which the desired time appears and then quickly to set another indicator to the exact second of that range. Then by throwing a charging control, the fuses at that time connected to the apparatus will immediately be charged to effect detonation at the expiration of the desired number of seconds following release from the aircraft. This apparatus of Fig. 13 also includes mechanism by which before the fuses are set the potential supply may be checked, and adjusted if necessary, to make certain that the desired fuse setting will be accurate.

The system of Fig. 13 will be seen to be generally similar to the system of Fig. 6 and to include certain features of Fig. 1, but as will become evident it includes many advantages in addition to those mentioned in connection with Figs. 1 and 6.

In this system as illustrated, five potential ranges are made available to set the fuse, each range covering 5 seconds. Hence, in the example here described, the bombs may be set to detonate at any desired setting from 5 to 30 seconds after release. To this end a multiple switch 161 and its control knob 162 are provided to select the range desired. Poles $S_9$ and $S_{10}$ of this switch are connected to introduce an adjustable potentiometer resistor $R_3$ in series with the bleeder resistors in such a way that the ratios of resistor $R_3$ to the selected values of the first bank of bleeder resistors $R_{14}$ to $R_{18}$ and the second bank of bleeder resistors $R_{19}$ to $R_{23}$ will cause potentiometer $R_3$ to provide successive and predetermined ranges of potential.

However, since the total value of resistor $R_3$ may not be conveniently changed and since it is required to subtend different potentials it follows that the total bleeder resistance for different ranges will change. This change in load is highly undesirable where great constancy in the setting voltage is desired, and consequently by means of switch pole $S_{12}$ a different parallel compensating resistor is introduced for each setting of the switches $S_9$ and $S_{10}$. These parallel compensating resistors $R_{29}$ to $R_{33}$ should be chosen so that the total parallel resistance load remains constant. No actual values of these resistors are here given because they may be calculated by one skilled in the art, once the circuit conditions and other constants are selected. For example, if the potential source happened to be of about the value required for the first range, the first resistor in the bank might be of a very low resistance value, or even of zero value.

A bleeder resistance connected across the direct-current source 59 and divided into sections designated $R_{24}$ and $R_{28}$, inclusive, is associated with switch $S_{11}$ so as to provide selection of a number of predetermined polarizing potentials for the timing circuit of the fuse. The advantage of using these polarizing potentials will be described in more detail in connection with Fig. 14. The source of direct current from which the necessary potentials are derived is here represented as a battery 69, and this source is protected by safety fuses 164 and 165 as well as by an on-off switch $S_{13}$.

In order to maintain the output potentials of the current source within exceedingly close limits without the use of metering equipment either too delicate or too heavy for general aircraft use, a potential-regulating system including two-electrode gaseous discharge tube $T_1$ a milliammeter 163 and rheostat $R_{12}$ may be employed and connected as shown. In this regulating system advantage is taken of the very flat slope which the current-voltage characteristic of gaseous discharge tubes display within certain ranges. On the basis of this phenomenon the difference of a fraction of a volt in several hundred across the two electrodes of the tube will correspond to a change in current through such a discharge tube of sufficient magnitude to be easily observed on an insensitive short scale meter suitable for use in aircraft. For this reason it is possible to adjust the potential effective across the entire potential-supply bleeder system by adjusting the series current-limiting rheostat $R_{12}$ until a predetermined current is observed in meter 163 to be flowing through the discharge tube $T_1$. By thus checking, and adjusting if necessary, the current source immediately before setting the controls of the fusesetting apparatus the accuracy of such setting will be assured. In order to set the fuses it is necessary that control knob 159 at the left of Fig. 13 be turned to the "armed" position. This knob rotates shaft 158 of a multiple switch comprising poles $S_6$—$S_8$ so as to connect the output of the fusesetting apparatus through the charging cable harness to the fuses themselves, When this knob 158 is thrown to the "inert" position the three potential-carrying wires of the main charging cable are shortcircuited and grounded. This feature of the invention operates as a safety device to prevent accidental charging of the timing circuits of the fuses which happen then to be connected to the charging harness, and not only thus prevents accidental operation of the fuse circuits, but also assures that when the fusesetting operation is commenced the condensers in the fuse circuits will receive their preselected charges when in a completely discharged condition.

This "armed-inert" control is also especially valuable in aircraft operation during warfare because its use enables the bombardier instantly to discharge all the timing circuits in the bomb fuses aboard his aircraft, so that in an emergency the bombs may be jettisoned over friendly territory without being detonated. The connections, below the double dash-dot lines, to the duplicate but unlettered terminals beneath terminals $E_2$ to $E_0$ are intended to represent all the parallel branches of the charging harness connecting to all of the time fuses and bombs stored in the aircraft. To simplify the drawings the duplicate fuses are not shown.

As shown in the drawings, selector switches $S_9$ and $S_{10}$, which in this instance make available five different potential and corresponding time ranges are interconnected in uni-control arrangement by shaft 161 rotatable by the range selector knob 162. This knob is, as shown, arranged with an index to indicate the five different time ranges from A to E inclusive. On this same shaft 161 is arranged the pole of switch $S_{11}$ which connects to the various sections $R_{24}$—$R_{28}$ of the bleeder resistance above referred to from which are derived the polarizing potentials, which may be applied to a condenser in the timing circuit of the fuze in order to extend the total timing range possible with a given value of condenser capacity. Switch $S_{12}$, also connected to the same shaft 61 so as to operate simultaneously with the other switches, connects with the same number of contact points as do the other four switches just referred to. The bank of resistors $R_{29}$—$R_{33}$ there shown as connected respectively to the different points of this switch and connected in common to the positive terminal of the potential supply system is introduced as a compensator in order to keep the load on the potential supply source constant under the varying conditions of load incident to selection of the different points on the range selector. The compensating resistors $R_{29}$—$R_{33}$ therefore must be chosen with this purpose in mind and the resistance values thereof required under any particular circuit conditions may be calculated by one skilled in the art.

Arrows 110–113 inclusive near the bottom of Fig. 13 represent the pins or connectors of a charging plug, and blocks 97–100 inclusive represent the corresponding contacts on the fuse. It will be noted that these charging plug contact pins, together with the corresponding contacts and the switch elements 126—129 and 104—107 and 48 correspond to the elements similarly designated in the assembly shown in Figs. 8 and 9. Prior to release of the fuse and to ejection or disconnection of the charging plug therefrom the circuit is that of the configuration shown in solid lines in the drawing. However, on withdrawal of the arming wire 91 either switch plate 95 (Fig. 8) or its equivalent switch plunger 151 (Fig. 11) moves the switch poles 126—129 into the positions shown in dotted lines in Fig. 13. In other words the solid line connections indicate the charging arrangement of the fuse circuits and the dotted line connections indicate the discharge or timing operation connections effected after separation of the fuse from the charging harness, assuming the use of a fuse constructed as in Figs. 8 and 9.

As has been described in connection with Figs. 1 and 6 the timing interval is a function of the adjustable potential $E_1$, and since precautions have been taken by means of tube $T_1$, rheostat $R_{12}$ and meter 163 to regulate the effective potential impressed on the charging circuit of the setting apparatus, it is possible to calibrate directly in seconds the dial associated with dial pointer 156 at the top of Fig. 13, in terms of several ranges of time. This dial pointer which controls the slider of potentiometer $R_3$ corresponds in general to the meter pointer 67 of Fig. 6, and it may be moved by any convenient means such as knob 157.

The operation of the fuse and setting apparatus therefor of Fig. 13 is as follows: In the fuse circuits of this system not only are timing condenser $C_1$ and ignition condenser $C_3$ initially charged, but timing condenser $C_2$ is also given an initial polarizing charge predetermined for the given range of timing involved, so that it will either decrease or increase the amount of charge necessary to be transferred from condenser $C_1$ through resistor $R_1$ before the potential across condenser $C_2$ is adequate to trigger off the relay tube 1. This polarization of the condenser $C_2$ in which a charge is built up to the discharge or relay point, may be either positive or negative with respect to the common potential terminal 107 of $C_1$ and $C_2$. In either case however it must not exceed the ignition voltage of the tube $T_1$ between G and K thereof if the tube is to be prevented from discharging prematurely. The values of the mentioned circuit elements may be the same as those given in the description of Figs. 1 and 6.

The timing operation is initiated when switch pole 128 completes the transfer path between condensers $C_1$ and $C_2$ by connecting with contact point 48 at the instant of release of the fuse. Subsequently, and when the safety air vane switch $S_{14}$ (comprising contact elements 83, 85, and 86 of Fig. 8) has closed, adequate charge will be added to the polarizing charge in condenser $C_2$, whether that polarizing charge be negative or positive, to cumulatively ionize the discharge path G—K of relay tube 1. This will initiate the relay action in tube 1 and release the energy of ignition condenser $C_3$ to ignite detonator 44. The action of the limiting resistor $R_2$ is the same as in the circuit illustrated in Fig. 6, and its value may likewise be 10,000 ohms.

Figure 14:
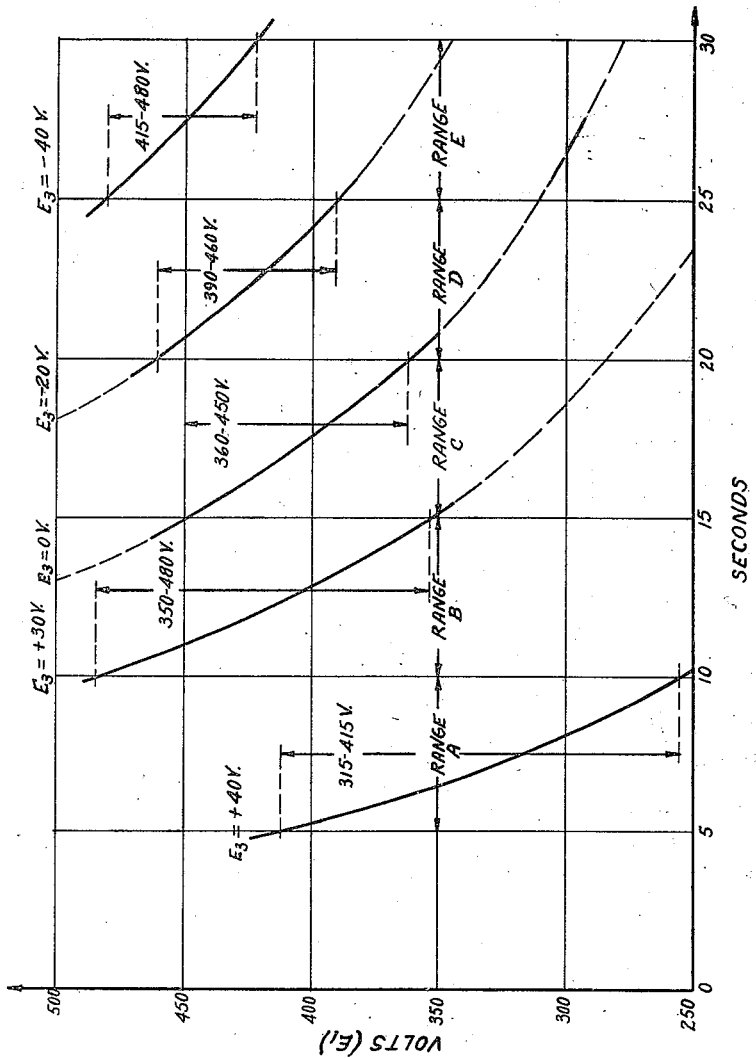
Fig. 14 illustrates graphically the time intervals as a function of impressed fuse voltages, for the several ranges of detonation time available in a certain embodiment of the system shown in Fig. 13.

By reference to the curves of Fig. 14 the effect of the several different polarizing voltages (potentials) employed to charge condenser $C_2$ may be seen, as well as the relation between the charging voltage $E_1$ of condenser $C_1$ and the resulting timing of the fuse. These voltages are similar to the voltages which would be produced by measuring the time-voltage fuse characteristics for a series of discharge tubes having progressively higher ignition potentials. The five voltage and time ranges marked A—E in Fig. 13 are here represented by the same letters. These five curves show the ranges in seconds which were secured with the circuit as shown in Fig. 13 when employing elements as described in connection therewith, with two different variables. The first variable is the different polarizing voltages $E_3$ and the second is the different charging or timing voltages $E_1$ represented by the ordinates on the graph. As pointed out in connection with Fig. 13 the selector of the different polarizing potentials results from moving switch 11, and the selection of the different potential ranges is effected by switches $S_9$ and $S_{10}$, whereas the fine selection of potential within each range is effected by potentiometer $R_3$. The different polarizing potentials are applied to timing condensers $C_2$ and charge the same to those potentials. The voltage range indicated on each curve by the vertical line is the voltage simultaneously applied to timing condenser $C_1$. All of the voltages, or potentials, represented in Fig. 14 were employed successfully in connection with a discharge tube as represented in Figs. 3, 4 and 8.

The consequence of the series of progressive polarizations shown in Fig. 14 is to permit a substantially wider range of time intervals to be covered with a single set of component circuit values and also improved accuracy throughout all of the ranges due to the steeper slope of the curve obtained by subdivision of the total possible time range into a group of appropriately polarized ranges.

It has already been explained that the electric time fuses and setting apparatus therefore above described were designed for use especially with aircraft bombs and flares and high velocity shells. However, it will be evident to those skilled in the art that the several features of my invention will have a wide range of applicability wherever timing circuits, or ignition circuits are required, or wherever charging apparatus or electrical fuse-setting apparatus is employed.

I claim:

1. In an electrical time fuse, the combination of a timing circuit, an ignition circuit and a gaseous discharge tube having a discharge path connected effectively in common to said circuits, said timing circuit including a first timing condenser connected to receive a timing charge, a second timing condenser connected to receive a polarizing charge, and a timing resistance connectable between said condensers, said ignition circuit including an ignition condenser connected to receive an ignition charge which is independent of the charges in said first and second condensers, and an ignition element connected to receive ignition energy from said ignition condenser.

2. In an electrical time fuse, the combination of three condensers, an ignition element and a plurality of coupling means, connections for coupling two of said condensers by one of said coupling means in a timing circuit whereby said condensers are connected to receive separate electrical charges, coupling means connected between one of said two condensers and an ignition circuit, said ignition circuit including the third condenser and said ignition element, and means for connecting said third condenser to receive an electrical charge independent of the charges in said two condensers.

3. In an electrical time fuse, the combination of three condensers, an ignition element, a resistance and a three-electrode gaseous discharge tube, connections for coupling two of said condensers by said resistance, one of said two condensers being connected to two electrodes of said tube, an ignition circuit including said ignition element, the third condenser, one of said two electrodes and the third electrode of said tube, and means for introducing separate electrical charges simultaneously in all three condensers.

4. In an electrical time fuse, the combination which comprises a timing circuit including two capacitors and at least one resistor, a separate ignition circuit including a third capacitor and an ignition element, a gaseous discharge tube having three electrodes and a discharge path between the first and second of said electrodes, the third electrode being electrically associated with said path, connections including said first and second electrodes in series in said ignition circuit and connections between said first and third electrodes and said timing circuit.

5. In an electrical time fuse the combination which comprises a gaseous discharge tube including three electrodes, a limiting resistance, a timing circuit including a timing resistance and two condensers connected on one side each to a common terminal and to a first electrode of said tube, and connected on the other side through said timing resistance to each other, one terminal of said timing resistance being connected through said limiting resistance to a second electrode of said tube, an ignition circuit including an ignition element and an ignition condenser, said ignition condenser being connected on one side to said common terminal and being connected on the other side through said ignition element to a third electrode of said tube.

6. In an electrical time fuse, the combination which comprises a gaseous discharge tube including three electrodes, a limiting resistance, a timing circuit including a timing resistance and two condensers connected on one side each to a common charging terminal and to a first electrode of said tube and connected on the other side through said timing resistance to each other, said timing resistance having two terminals, one terminal of said timing resistance being connected through said limiting resistance to a second electrode of said tube, said limiting resistance having a greatly lower value than that of said timing resistance, and the other terminal of said timing resistance being connected to a second charging terminal, and an ignition circuit including an ignition element and an ignition condenser, said ignition condenser being connected on one side to said common charging terminal and being connected on the other side through said ignition element to a third electrode of said tube.

7. In an electronic time fuse, the combination which comprises, a gaseous discharge tube including a cathode, an anode and a control electrode, a discharge path within said tube between said cathode and anode, a timing circuit including a timing condenser and a timing resistance connected between said cathode and control electrode, an ignition circuit including an ignition condenser and a detonating device connected in series between said cathode and anode, and connections through which said condensers may be charged, said timing and ignition circuits being electrically isolated from each other except through said discharge path within the tube.

8. In an electronic time fuse, the combination which comprises, a gaseous discharge device including three electrodes, a discharge path within said device associated with said electrodes, a timing circuit including as elements a timing condenser and a timing resistance connected to a first and a second of said electrodes, an ignition circuit including as elements a detonator and an ignition condenser connected to said third electrode and to one of said first two electrodes, and connections through which said condensers may be charged, said timing and ignition circuits being electrically isolated from each other except through said discharge path within the tube.

9. In an electronic time fuse, the combination which comprises, a gaseous discharge device including three electrodes, a discharge path within said device associated with said electrodes, a timing circuit including as elements a timing resistance and a timing condenser effectively connected between a first and a second of said electrodes, an ignition circuit including as elements a detonator and an ignition condenser effectively connected between said third electrode and one of said first two electrodes, said timing condenser being of accurate low loss type and said ignition condenser having a capacity value much greater than that of said timing condenser, and connections through which said condensers may be charged, said timing and ignition circuits being electrically isolated from each other except through said discharge path.

NATHANIEL B. WALES, Jr.

Certificate of Correction

Patent No. 2,404,553.  July 23, 1946.

NATHANIEL B. WALES, JR.

It is hereby certified that errors appear in the printed specification of the above numbered patent requiring correction as follows: Column 5, line 65, for "fixed" read *fired*; column 8, line 11, before "stages" insert *last*; column 13, line 8, for "fhom" read *from*; column 19, line 40, for "fuze" read *fuse*; and that the said Letters Patent should be read with these corrections therein that the same may conform to the record of the case in the Patent Office.

Signed and sealed this 15th day of October, A. D. 1946.

[SEAL]

LESLIE FRAZER.
*First Assistant Commissioner of Patents.*